Figures 1, 2:
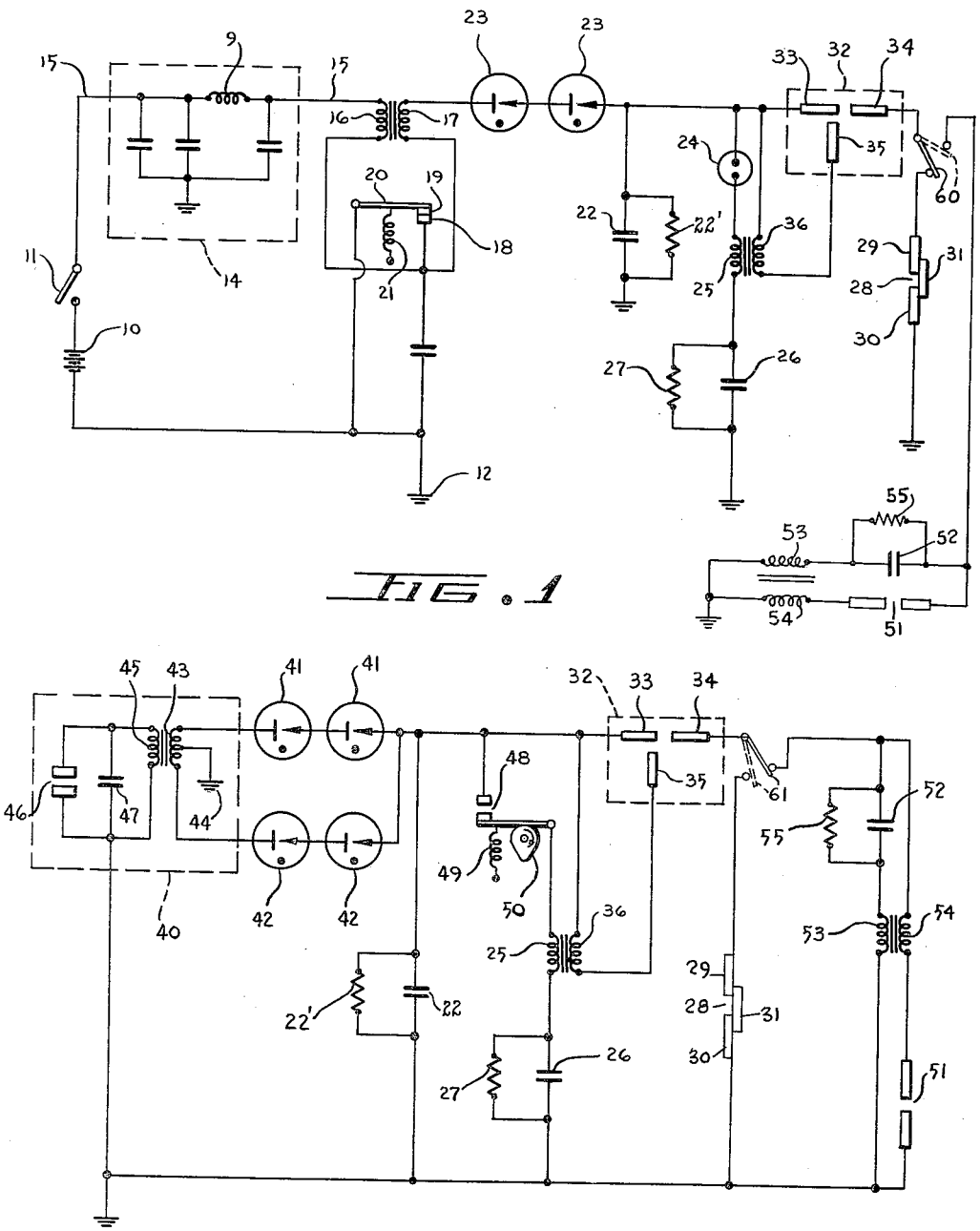

INVENTOR.
LOUIS H. SEGALL
BY Dale A. Bauer
ATTORNEY

United States Patent Office 2,978,611
Patented Apr. 4, 1961

2,978,611

ELECTRICAL DISCHARGE CONTROL SYSTEM

Louis H. Segall, Sidney, N.Y., assignor to The Bendix Corporation, a corporation of Delaware Filed Apr. 17, 1953, Ser. No. 349,367

19 Claims. (Cl. 315—180)

This invention relates to electrical apparatus and more particularly to means for controlling the intermittent or pulsating flow of electrical energy at relatively low voltage across a spark gap having a somewhat higher normal spark over voltage.

One of the objects of the present invention is to provide a novel electrical circuit whereby electrical energy at low voltage is transformed and controlled in a novel manner to effect the performance of work at a higher voltage.

Another object of the invention is to provide a novel apparatus and method for producing a series of sparks in timed or untimed relation, such as for ignition purposes.

A further object is to provide a novel ignition system for combustion engines or the like, including piston engines and so-called jet and gas turbine engines.

Still another object is to provide a novel electrical circuit which is capable of producing sparks with relatively high energy but which is of simple construction and light weight.

A still further object is to provide a novel condenser discharge type of electrical circuit for producing a series of high energy impulses at relatively low voltage.

Another object is to provide a novelly constructed circuit for producing a series of electrical impulses, which circuit, except for the current generating means, does not require the use of any moving parts.

The above and further objects and novel features of the invention will more fully appear from the following detailed description when the same is read in connection with the accompanying drawings. It is to be expressly understood, however, that the drawings are for the purpose of illustration only and are not intended to define the limits of the invention, reference for this latter purpose being had primarily to the appended claims.

In the drawings, wherein like reference characters refer to like parts throughout the several views, Fig. 1 is a diagram illustrating one form of electrical circuit embodying the invention; and Fig. 2 is a diagram of another form of electrical circuit embodying the invention.

In adapting equipment for use on aircraft, skilled artisans have long endeavored to reduce the weight of and space consumed by such equipment without jeopardizing the operability, effectiveness, and efficiency thereof at all altitudes and under all operating conditions, and without reducing the factor of safety and the useful operating life thereof. The electrical system which is comprehended by the present invention and which is adapted for use as an ignition system for aircraft, as well as other types of engines, has all of the above attributes. The two embodiments of the invention illustrated, by way of example, in the accompanying drawings are in the form of novel circuits for producing relatively high energy sparks or arcs between spaced electrodes with a relatively low voltage source of electrical energy. These circuits are of the condenser discharge type and have been found particularly useful for igniting combustible charges in so-called jet, gas turbine and other types of combustion engines.

As shown in Fig. 1, one suitable embodiment of the invention comprises, as a source of electrical energy, a battery 10 which may be connected to the remainder of the circuit by means of a switch 11 and a ground or equivalent connection 12. It will be understood, however, that other known types of sources of electrical energy may be used, either simultaneously with or alternatively in lieu of the battery. The battery 10 may be of the storage battery type having a 24 volt rating and capable of delivering as much as about 30 volts when connected to a suitable charging means, such as a charging generator. If there is need for it, such as in instances where the source of energy supplies other circuits, suitable filtering means 14 may be provided to prevent radio frequencies from feeding back into circuits emanating from the battery or other source. In the particular embodiment shown, the filtering means comprises three by-pass condensers connected between ground and the power supply line 15, in which there is an inductance 9, but other known types of filters may be used, and in some installations none is necessary.

The battery voltage may be stepped up to a desired higher voltage by any suitable means, such as a vibrator, which may be connected to the battery in any suitable known manner to effect an interrupted current flow. As illustrated, the vibrator includes a transformer comprising a primary winding 16 inductively coupled with a secondary winding 17. The primary winding is connected at one end to power supply lead 15 from one terminal of the battery and at its other end through separable contacts 18, 19, an armature 20 and ground or other suitable return to the other terminal of the battery. Contact 18 is stationarily mounted, whereas contact 19 is mounted on a pivoted or resilient armature 20 to which may be attached a spring 21 for normally holding the contacts in closed or engaged position. When the circuit is closed through contacts 18, 19, electrical current flowing through primary winding 16 creates a magnetic field which is capable of magnetically actuating armature 20 against the efforts of spring 21 to separate said contacts and open or break the primary circuit. The magnetic field then collapses and the spring becomes effective to re-engage contacts 18, 19 to again close the circuit through the battery and primary winding. This cycle of operation is repeated in rapid succession and the interrupted current flow through coil 16 at battery voltage is effective to induce a higher voltage across secondary winding 17.

In the form shown the low potential ends of windings 16, 17 are connected together although winding 17 may be connected independently to ground or, if desired, the windings need not be connected other than inductively. A storage condenser 22 is connected across secondary winding 17 in series with one or more rectifiers 23. The capacity of condenser 22 may vary widely, depending upon the energy required in the igniting spark. For combustion engine uses it has been found suitable to use condensers having capacities ranging from .25 to 5 microfarads. The condenser charging circuit may be completed through ground, or any other suitable connection. The rectifier means may be of the gaseous tube type or of any other suitable known type, such as selenium rectifiers, adapted for passing energy of a selected polarity to storage condenser 22 and for blocking its return flow from the condenser to the transformer. The condenser will thus be charged step-by-step or in successive increments to a voltage determined by the design of the transformer and the voltage of the source of electrical energy. The rectifier means may be dispensed with if the source of electrical energy is of such a nature as to be capable of charging condenser 22 to a desired high voltage by a single impulse or otherwise in such a manner that the condenser is not permitted to discharge back through the charging circuit.

Although it is not necessary, a resistor 22' may be connected across condenser 22 to bleed residual energy therefrom when the system is not in use. This avoids the danger of electrical shocks to personnel working on the system for overhaul or repair. A ten (10) megohm resistor is ample and will not appreciably affect the normal operation.

For the purpose of controlling the discharge of condenser 22 through a load circuit to attain a novel and useful result, there is connected across or in parallel with said condenser a first branch circuit which is novelly constructed to determine or control the voltage at which the storage condenser is permitted to discharge. Said branch or control circuit is connected at one end to the high potential terminal of the storage condenser and comprises in series a control or triggering gap 24, an inductance 25 which is the primary winding of a transformer, and a small condenser 26. The return connection may be through ground or otherwise and preferably a resistor 27 is connected in shunt with condenser 26.

Spark gap 24 is designed to have a relatively predetermined or constant break-down or spark-over voltage and is accordingly preferably of the sealed type, so that the spark-over or break-down voltage thereof remains substantially constant and independent of surrounding pressures and other atmospheric conditions at different altitudes. One type of spark gap which has been found suitable is disclosed in Linkroum et al. U.S. Patent No. 2,540,399. The capacity of condenser 26 is preferably small in comparison to that of storage condenser 22 so that only a relatively small amount of energy from the storage condenser is required to fully charge it. Accordingly, the current carrying burden placed upon control or triggering gap 24 is minimized and the life and efficiency thereof are substantially increased. The weakest link in prior known comparable electrical systems has thus been materially strengthened, thereby making possible the use of a relatively delicate or sensitive, low-voltage control gap while simultaneously improving the durability and dependability of the system as a whole. The resistance 27 is effective to bleed off or absorb any residual charge on condenser 26 after each cycle of operation of the system in the manner to be hereinafter explained. The resistor also dissipates any energy which may leak past control gap 24 during the charging of condenser 15 to the break-down voltage of said gap to thereby insure a constant or pre-determined flow of energy from condenser 22 to condenser 26 during each cycle of operation.

The major portion of each charge built up on storage condenser 22 is discharged through and utilized in a second branch or sparking circuit which is also connected across or in parallel with said storage condenser. This second branch includes an energy-consuming load which in the illustrated embodiment is a spark or igniter gap 28 that comprises spaced electrodes 29 and 30 and may be in the form of a spark plug or igniter plug of the type used in ignition system for combustion engines. As shown in Fig. 1 the gap 28 is of the type which is bridged by a high resistance or a semi-conductor 31 to facilitate the formation of a high energy spark or arc across the electrodes of the gap at relatively low voltage. One suitable form of igniter plug or device embodying a gap thus bridged is disclosed in U.S. Patent No. 2,786,158. The bridged igniter gap 28 is of the type now generally known as and may be referred to herein as a "shunted surface spark gap."

Connected in series with igniter gap 28 in the sparking circuit is a hold-off spark gap device 32 comprising spaced input and output electrodes 33 and 34, respectively. This spark gap is also preferably but not essentially of the sealed type and segregates the igniter gap from the storage condenser while the latter is being charged. The normal spark-over voltage of gap 33, 34 is somewhat greater than the effective spark-over voltage of control gap 24 and hence, greater than the maximum voltage to which condenser 22 is normally charged. The hold-off gap is rendered conductive to the charge on the storage condenser in a novel manner by means of a third or triggering electrode 35 which is preferably mounted relatively close to input electrode 33 in envelope 32 and is connected in series with a coil or winding 36 to a terminal or lead which is in turn connected to said input electrode 33. Winding 36 is inductively coupled with coil 25 and forms therewith a transformer 25, 36. The coupling and design of the transformer are such as to create a voltage in the secondary circuit in excess of the break-down voltage of ionizing gap 33, 35 when condenser 22 discharges across control gap 24 through primary winding 25 to charge condenser 26. By impressing such a voltage across gap 33, 35 the gaseous medium between electrodes 33 and 34 becomes ionized and thereby reduces the break-down voltage of the hold-off gap 33, 34 to a value below the voltage of the charge on condenser 22.

In one practical embodiment of the above described circuit or system, the source of electrical energy may, as pointed out above, comprise a standard 24-volt storage battery which, when the ignition switch 11 is closed, causes current to flow through primary winding 16 and the normally closed vibrator contacts 18, 19. As further pointed out above, the operation of the vibrator contacts results in the flow of interrupted direct current through primary winding 16 which induces a higher voltage across secondary winding 17. The vibrator transformer may be designed to produce any of a wide range of secondary voltages. For the ignition system of a present-day jet type engine, it has been found that a secondary voltage of about 2,500 to 3,500 volts is desirous in a system such as that shown in Fig. 1. Energy is thus caused to flow through rectifier means 23 in pulses to charge storage condenser 22 in increments or step-by-step to a voltage of about 2,500 to 3,500 volts or other chosen voltage. Each of the rectifiers has a selected hold-off voltage and the sum of these voltages should be in excess of the maximum charge desired on the storage condenser to prevent the latter from discharging back through secondary winding 17. Transformer 25, 36 may be a step-up transformer having a ratio of about 3 to 1 and resistors 27 and 55 may have a value of about .1 megohm.

The sealed control gap 24 is so designed that when the storage condenser attains a charge of about 2,500 volts or other selected voltage, the gap will break down and permit a partial discharge of condenser 22 into condenser 26 through primary winding 25. The small condenser 26 assumes a full charge very rapidly without absorbing any appreciable percentage of the charge built up on condenser 22. The latter may, for example, have a capacity of from somewhat less than .25 microfarads to somewhat more than 5 microfarads, whereas the capacity of condenser 26 may be as little as .01 to .03 microfarad. Accordingly, the flow of current across gap 24 is of short duration, but the same reaches a relatively high peak value to provide a desirable transfer of energy to secondary winding 36. A sufficient voltage is thus impressed across gap 33, 35 to effect ionization of the gaseous medium between electrodes 33 and 34. This ionization reduces the break-down voltage of the hold-off gap and renders it conductive at the voltage then existing across storage condenser 22. The latter will accordingly discharge the major portion of its charge across the hold-off gap to the shunted surface igniter gap 28. The normal break-down voltage of the spark gap between electrodes 29 and 30 is materially greater than the voltage to which condenser 22 is charged, but initially a small amount of energy from the condenser passes through or along the surface of element 31 between the electrodes. This flow of energy is apparently effective to ionize the gaseous medium of the gap between electrodes 29, 30 and thereby reduce the resistance of said medium so that the condenser will discharge across the gap and create an arc of very considerable energy at a relatively low voltage considering the width of the gap. The spark gap 28 may be of such width that in the absence of resistor 31, a voltage in excess of 4,000 volts or more would be required to bridge it and hence create a spark at atmospheric pressure.

The sparking rate at gap 28 may be determined with a reasonable degree of accuracy by properly designing the various elements of the system, such as the vibrator, transformer, rectifiers, condensers, etc. It will be understood, of course, that the sparking rate will vary with changes in the source voltage, but this variation may be countered or reduced to a substantial extent by properly designing the vibrator transformer 16, 17 in the light of the known variation in the source voltage. This is accomplished by designing the transformer to operate at the available voltages along the so-called knee of the magnetization curve of the transformer core, which may be of the air gap type to thereby give good energy transfer without excessive variation.

During each cycle of operation some of the charge attained by condenser 26 may be discharged across gap 33, 34 and the igniter gap 28 while these two gaps are conducting the discharge of condenser 22. Any residual charge remaining on condenser 26 at the end of each cycle of operation as well as any energy which may leak past control gap 24 during the charging of the storage condenser is dissipated by resistor 27. The ohmic value of this resistance may be in the vicinity of .1 megohm. Upon initiation of each discharge of condenser 22 through the control gap, the condenser 26 will be at substantially zero potential, thus assuring a maximum voltage differential between the two condensers and, hence, a maximum rise in the charging current which flows through coil winding 25 to induce the desired ionizing voltage across secondary winding 36 and hence across gap 33, 35. It will be seen that control gap 24 is required to carry only a very small amount of current, thereby materially increasing the life thereof over one which might be required, as in some known systems, to carry the entire flow of energy during each discharge of the storage condenser.

In the embodiment or modification shown in Fig. 2, a magneto 40 is provided as the source of electrical energy for repeatedly charging storage condenser 22 through two sets of rectifiers 41 and 42 in a manner well understood in the art. The secondary winding 43 of the magneto coil has a center tap which is grounded at 44 so that current of one polarity flows through rectifiers 41 and current of opposite polarity flows through rectifiers 42 to charge condenser 22 step-by-step or in small increments. The primary winding 45 of the magneto coil is connected in circuit in the usual manner with a circuit breaker 46 which may be cam operated and across which is connected a condenser 47.

The energy stored in condenser 22 may be intermittently released in the same manner as described above in connection with the embodiment of Fig. 1; that is, under the control of a control spark gap in circuit with primary winding 25 and condenser 26. However, if accurately timed impulses are desired the spark gap may be replaced by a contactor 48 which is normally held in open position by a spring 49 and is intermittently closed by a rotatably driven cam 50. When contactor 48 is closed, condenser 22 will discharge and the resultant operation of the system is the same as that described above in connection with the circuit of Fig. 1. If desired one set of the rectifiers 41, 42 may be dispensed with, but in that event the storage condenser will be charged only about half as fast.

That portion of the circuit connected to the output electrode 34 of the hold-off spark gap device 32 may comprise a shunted-surface type spark plug or igniter plug 29—31 when a selector switch 61 is in its illustrated dotted line position. Alternatively, when switch 61 is in its illustrated full-line position, one branch of two parallel circuits connected to the output terminal 34 of the hold-off spark gap includes a high voltage spark or igniter gap 51 of the more usual or better known high tension type wherein the electrodes are wholly insulated from one another. In modern engines a spark gap of this type is usually designed to have a normal spark-over voltage of about 15,000 volts in the combustion chamber of an engine, i.e., a voltage which may be several times greater than the maximum voltage across condenser 22. Accordingly, igniter gap 51 must be first ionized to permit the lower voltage charge from the storage condenser to flow across the same for creating the high energy igniting spark. This is accomplished by connecting the output side of gap 33, 34 to parallel branches or circuits, one of which includes a condenser 52 that is of small capacity in comparison to storage condenser 22 and is connected in series with the primary winding 53 of a step-up transformer, said primary winding being connected at one end to ground. The capacity of condenser 52 may be comparable to that of condenser 26. The other said branch or circuit includes the secondary winding 54 inductively coupled with primary winding 53 and the igniter gap 51 in series. For dissipating residual energy on condenser 52 after each operation of the circuit, there is provided in shunt therewith a resistor 55.

When hold-off gap 33, 34 is rendered conductive in the manner described above, the voltage is insufficient to bridge gap 51, and hence, the initial flow of energy is into condenser 52 and through primary winding 53. The small condenser 52 is charged very rapidly and the charging current which flows through primary winding 53 rises very rapidly or abruptly to a relatively high peak value and induces a sufficiently high voltage across secondary winding 54 to impress a spark across the electrodes and thus ionize or trigger igniter gap 51. The spark-over voltage of this gap is thus reduced so that the remainder of the charge on condenser 22 finds the path of least resistance across the ionized igniter gap and creates the high energy spark or arc which contains the desired amount of heat for igniting the combustible charge in the engine. The major portion of the charge on condenser 52 will also be discharged across the igniter gap with the main charge from the storage condenser. Any residual charge on condenser 52 after gap 51 ceases to be conductive will be dissipated by resistor 55 thus insuring a maximum voltage differential between condensers 22 and 52 when hold-off gap 33, 34 becomes conductive.

If a plurality of igniter gaps 28 or 51 are required to be fired in succession or in timed relation, a suitable distributor of known construction may be inserted at a suitable place in either circuit and parts on the output side of the distributor, including the igniter gaps, may be multiplied in accordance with the number of igniter gaps required. It will also be apparent that the shunted surface type of igniter gap employed in the embodiment of Fig. 1 may be replaced by that portion of the circuit of Fig. 2 which is connected to the output terminal of hold-off spark gap device 32. This alternative embodiment which includes elements 51 to 54, inclusive, is illustrated in Fig. 1 and may be connected, in lieu of igniter gap 28, to spark gap terminal 34 by means of a switch 60. Additionally in some installations, the output terminal of device 32 may be connected directly to a sparking device having insulated electrodes so mounted that the normal spark-over voltage thereof does not exceed the voltage of the charge on the storage condenser.

Although only a limited number of embodiments and modifications of the invention have been illustrated in the accompanying drawing and described in the foregoing specification, it is to be expressly understood that the invention is not so limited, but may be embodied in other specifically different circuits. For example, other well-known sources of interrupted, pulsating, direct or alternating current may be provided in lieu of the magneto or battery-vibrator combination illustrated, such as a D.C. or A.C. generator, and other suitable types of rectifiers known to the art may be utilized in lieu of the type illustrated and specifically mentioned. Additionally, the various parts of the circuit, particularly many of the parts which are series connected, may be rearranged with respect to each other without appreciably affecting the operation of the circuit. Various other changes may also be made, such as in the electrical values suggested herein, by way of example, without departing from the spirit and scope of the invention, as the latter will now be understood by those skilled in the art.

What is claimed is:

1. In electrical apparatus comprising a source of electrical energy including a storage condenser, the combination therewith of a sparking circuit comprising a hold-off gap and an igniter gap connected in series across said storage condenser, and means responsive to and automatically operable when the charge on said condenser attains a pre-determined voltage below the normal spark-over voltage of said hold-off gap for rendering the latter conductive to said charge, said means comprising circuit means connected to said storage condenser, said circuit means including a triggering gap adjacent said hold-off gap for effecting ionization of the latter and further including a control gap and a condenser connected in series for effecting a partial discharge of said storage condenser at said pre-determined voltage to create a discharge across said triggering gap to ionize said hold-off gap.

2. Electrical apparatus as defined in claim 1 wherein said hold-off gap and said triggering gap have a common electrode.

3. Electrical apparatus as defined in claim 1 comprising a transformer having the primary winding thereof connected in series with said control gap and said second-named condenser, the secondary winding of said transformer being connected across the terminals of said triggering gap.

4. Electrical apparatus as defined in claim 1 comprising a third condenser and a transformer, the secondary winding of said transformer being connected in said sparking circuit between said hold-off gap and said igniter gap, and said third condenser and the primary winding of said transformer being connected in series across said secondary winding and said igniter gap.

5. In electrical apparatus, a source of electrical energy including a storage condenser, a step-up transformer, a sparking circuit comprising a hold-off gap, the secondary winding of said transformer and an igniter gap connected in series across said storage condenser, means for rendering said hold-off gap conductive to the charge on said condenser when said charge attains a voltage below the normal spark-over voltage of said hold-off gap, said means comprising circuit means connected to said storage condenser including a triggering gap adjacent said hold-off gap for effecting ionization of the latter, a second condenser and means for controlling a partial discharge of said storage condenser into said second condenser to create a discharge across said triggering gap to ionize said hold-off gap, and a third condenser and the primary winding of said transformer connected in series across said secondary winding and said igniter gap.

6. Electrical apparatus as defined in claim 5 wherein said means for controlling the partial discharge of the storage condenser comprises a periodically actuated contactor for completing the circuit between said storage condenser and said second condenser.

7. Electrical apparatus as defined in claim 5 wherein said means for controlling a partial discharge of said storage condenser comprises a control gap having a substantially constant spark-over voltage below the normal spark-over voltage of the hold-off gap.

8. In electrical apparatus, a source of electrical energy comprising a storage condenser, circuit means comprising first and second branches connected in parallel across said condenser, said first branch comprising a control gap, the primary winding of a transformer and a second condenser, and said second branch comprising a hold-off gap and an igniter gap, a secondary winding inductively coupled with said primary winding, and a triggering gap for said hold-off gap connected across said secondary winding.

9. Electrical apparatus as defined in claim 8 wherein said hold-off gap and said triggering gap have a common electrode.

10. Electrical apparatus as defined in claim 9 wherein said common electrode is directly connected to a terminal of said storage condenser.

11. In electrical apparatus, a source of electrical energy including a storage condenser, a hold-off gap and an igniter gap connected in series across said condenser, a triggering gap adjacent said hold-off gap, and means including a control gap and a condenser connected in series across said storage condenser for initiating a discharge across said triggering gap to thereby ionize said hold-off gap to reduce the spark-over voltage thereof and effect the discharge of said storage condenser across the same.

12. Electrical apparatus as defined in claim 11 wherein said igniter gap is a shunted surface spark gap.

13. In electrical apparatus, a source of electrical energy including a storage condenser, a hold-off gap and an igniter gap connected in series across said condenser, a triggering gap adjacent said hold-off gap, means including a second condenser and means for intermittently operatively connecting said second condenser across said storage condenser for initiating a discharge across said triggering gap to thereby ionize said hold-off gap and reduce the normal spark-over voltage thereof, a third condenser, and a transformer having a secondary winding connected in series with said hold-off gap and said igniter gap, the primary winding of said transformer being connected in series with said third condenser across said secondary winding and said igniter gap.

14. Electrical apparatus comprising a source of electrical energy including a storage condenser, a transformer having primary and secondary windings, circuit means comprising first and second branches, said first branch comprising in series a control a gap, the primary winding of said transformer and a second condenser and said second branch comprising a hold-off gap including spaced input and output electrodes and an igniter gap in series with said hold-off gap, said branches being connected in parallel across said storage condenser, a triggering gap comprising a third electrode in spark gap relation to one of said hold-off gap electrodes, and means including the secondary winding of said transformer connected across said triggering gap, said primary and secondary windings being inductively coupled and said control gap having a spark-over voltage which is lower than the normal spark-over voltage of said hold-off gap.

15. Electrical apparatus as defined in claim 14 wherein said source includes means for charging said storage condenser and rectifier means connected between said charging means and said storage condenser.

16. Electrical apparatus as defined in claim 14 wherein said source comprises means for charging the storage condenser step-by-step in increments.

17. In electrical apparatus of the class described, a storage condenser, means for charging said condenser, a second condenser of smaller capacity than said storage condenser, a control spark gap connected in series with said second condenser across said storage condenser whereby the latter will partially discharge into said second condenser when the voltage of the charge on said storage condenser reaches the spark-over voltage of the control gap, a three-electrode gap having the gap formed by two of the electrodes thereof connected in series with an electrical load across said storage condenser, and means including a transformer energized by said partial discharge of the storage condenser for initiating a discharge between the third and another electrode of said three-electrode gap to render the gap between said two electrodes conductive to the remaining charge on said storage condenser.

18. The method of producing an electrical spark discharge which comprises the steps of charging a storage condensers, partially discharging said condenser through a control gap automatically and in response to the charge on said condenser when charge attains the spark-over voltage of said control gap, utilizing the energy of said partial discharge to ionize a spark gap and render the latter conductive to the remaining charge on said condenser, and thereafter discharging said condenser across said spark gap independently of said control gap.

19. The method of producing an electrical spark discharge which comprises the steps of charging a storage condenser, partially discharging said condenser across a control gap into a second condenser of smaller capacity in response to and automatically when the charge on said storage condenser attains the spark-over voltage of said control gap, utilizing said partial discharge to ionize a spark gap, and thereafter discharging said storage condenser directly across said spark gap independently of said control gap.

References Cited in the file of this patent

UNITED STATES PATENTS

| | | |
|---|---|---|
| 2,104,128 | Honaman | Jan. 4, 1938 |
| 2,186,013 | Edgerton | Jan. 9, 1940 |
| 2,509,005 | Lord | May 23, 1950 |
| 2,700,120 | Germeshausen | Jan. 18, 1955 |